United States Patent Office 3,325,288
Patented June 13, 1967

3,325,288
FEED CONTAINING INORGANIC ACID SALT OF 2,2,4-TRIMETHYL - 6 - ETHOXY - 1,2 - DIHYDROQUINOLINE
Ching C. Tung, Kirkwood, Mo., assignor to Monsanto Company, St. Louis, Mo., a corporation of Delaware
No Drawing. Filed July 22, 1965, Ser. No. 474,136
4 Claims. (Cl. 99—2)

This application is a continuation-in-part of abandoned application Ser. No. 300,623, filed Aug. 7, 1963.

This invention relates to new and improved antioxidants useful in animal foods for preventing the loss of vitamins A and E, and other components known to deteriorate through oxidation. More specifically, the invention is directed to the preparation of certain salt derivatives of dihydroquinolines which are more effective antioxidants than are the free dihydroquinoline bases.

The dihydroquinolines of the following formula are herein referred to as free bases and are known to have antoxidant properties:

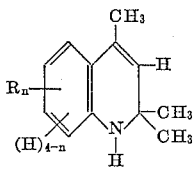

wherein $n$ is an integer from one to two; and wherein R is alkyl having from 1 to 5 carbon atoms, alkoxy having from 1 to 5 carbon atoms, phenyl, benzyl, phenoxy or benzyloxy. Representative alkyl and alkoxy substituents include, for example, methyl, ethyl, n-propyl, isopropyl, n-butyl, isobutyl, tertiary butyl, amyl, methoxy, ethoxy, n-propoxy, isopropoxy, n-butoxy, isobutoxy, tertiary butoxy, amyloxy and the like.

It has been found that improved antioxidants can be prepared by reacting the dihydroquinolines with strong inorganic acids, such as sulfuric, phosphoric, hydrochloric, hydrobromic and sulfurous acid. In particular, improved antioxidants prepared by reacting the 2,2,4-trimethyldihydroquinolines with these acids in addition to being superior antioxidants, are free-flowing solid products which are readily adaptable to formulation with fibrous or amorphous substances.

The new compounds are salts of the dihydroquinolines and are prepared by dissolving the dihydroquinoline in a suitable solvent in which the salts are insoluble. Such solvents include the hydrocarbons such as benzene, toluene, xylene, petroleum ether, gasoline, kerosene and other petroleum fractions, the ketones, such as acetone and methyl ethyl ketone; and the ethers, such as diethyl ether. Frequently, elevated temperatures within the range of from about 30° C. to the reflux temperatures of the reaction mixtures are required to effect a complete reaction and formation of the desired salt.

EXAMPLES OF SALT PREPARATION

*Example 1*

A reaction flask was charged with 21.7 grams of 2,2,4-trimethyl-6-ethoxy-1,2-dihydroquinoline and 150 ml. of benzene. The reaction mixture was stirred at 20° C. and 10 grams of 37% aqueous hydrochloric acid (HCl) added. The mixture was refluxed at 81° C. for three hours during which 10 ml. of water were removed from the distillate. The reaction mixture was then cooled to 5° C. and the precipitated solid product was identified as 2,2,4-trimethyl-6-ethoxy-1,2-dihydroquinoline hydrochloride.

*Example 2*

A reaction flask was charged with 108.5 grams of 2,2,4-trimethyl-6-ethoxy-1,2-dihydroquinoline and 150 ml. of acetone. This reaction mixture was gradually combined with 51 grams of 96% sulfuric acid ($H_2SO_6$). During the reaction the temperature of the reaction mixture increased to reflux temperature. After the completion of the reaction as evidenced by a subsidence of the raction temperature, the mixture was cooled to 25° C. A white crystalline product, M.P. 161.5 to 163° C., was identified as 2,2,4-trimethyl-6-ethoxy-1,2-dihydroquinoline sulfate, a 1:1 mol ratio salt of sulfuric acid and 2,2,4-trimethyl-6-ethoxy-1,2-dihydroquinoline.

*Example 3*

A reaction flask was charged with 43.4 grams of 2,2,4-trimethyl-6-ethoxy-1,2-dihydroquinoline and 50 ml. of acetone. The flask and its contents were heated to reflux temperature and 32.2 grams of 85% phosphoric acid ($H_3PO_4$) were added. During one hour acetone and water were evaporated. Anhydrous acetone in the amount of 50 ml. was added to the reaction mixture and upon standing at room temperature a white crystalline salt, M.P. 113.5 to 115° C., was precipitated and identified as 2,2,4-trimethyl-6-ethoxy-1,2-dihydroquinoline phosphate, a 1:1 mol ratio salt of phosphoric acid and 2,2,4-trimethyl-6-ethoxy-1,2-dihydroquinoline.

The salts prepared in the practice of this invention can be represented by the following formula:

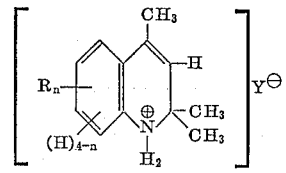

wherein R and $n$ are as defined above with respect to the free base and wherein $Y^\ominus$ is an anion of the group consisting of $HSO_4^\ominus$, $HSO_3^\ominus$, $Br^\ominus$, $Cl^\ominus$, and $H_2PO_4^\ominus$.

USE OF ANTIOXIDANTS

*Example 1*

The effect of 2,2,4-trimethyl-6-ethoxy-1,2-dihydroquinoline on the stabilization of carotene in alfalfa was studied by storing at 55° C. samples of dehydrated alfalfa treated with the said dihydroquinoline. The hydrochloric acid salt and the sulfuric acid salt of the same dihydroquinoline were also studied. An untreated alfalfa sample was used as a control. The carotene content was determined initially after two weeks' treatment. The following table sets forth the percentage of the original carotene remaining after the two weeks' treatment. Six replicates of each of the treated alfalfa samples were analyzed before and after the heat treatment. The treated samples of alfalfa included some with 0.015 percent by weight of the free base 2,2,4-trimethyl-6-ethoxy-1,2-dihydroquinoline or the salt.

| | | | | | | | |
|---|---|---|---|---|---|---|---|
| Free base | 34.0 | 34.0 | 32.9 | 34.0 | 35.0 | 32.9 | [1] 33.8 |
| HCl salt | 38.7 | 36.0 | 38.7 | 36.5 | 37.1 | 35.4 | [1] 37.1 |
| 1:1 $H_2SO_4$ salt | 35.4 | 35.4 | 36.0 | 34.3 | 35.4 | 34.3 | [1] 35.1 |
| None | 20.5 | 20.5 | 20.0 | 20.0 | 22.3 | 21.3 | [1] 20.7 |

[1] Average.

*Example 2*

The salts of the dihydroquinolines can be used in aqueous solution to treat alfalfa in the field. A series of experiments comparing an aqueous emulsion of the free base 2,2,4-trimethyl-6 - ethoxy - 1,2 - dihydroquinoline and an aqueous solution of the corresponding sulfuric acid salt were compared to fields in which no antioxidant was added. The table below indicates the measured results in five replications of each experiment showing the original carotene content, the content after two weeks at 55° C. and the percentage retained.

CAROTENE

| Test Compound | Replications | I.U./lb. Originally | I.U./lb. After 2 wks. at 55° C. | Percent Retained |
|---|---|---|---|---|
| None | 1 | 137,400 | 69,600 | 50.7 |
| Do | 2 | 137,400 | 66,600 | 48.5 |
| Do | 3 | 134,400 | 62,400 | 46.4 |
| Do | 4 | 134,400 | 61,800 | 46.0 |
| Do | 5 | 131,400 | 61,200 | 46.6 |
| Do | (¹) | 135,000 | 64,320 | 47.6 |
| Free base emulsion | 1 | 137,400 | 66,000 | 48.0 |
| Do | 2 | 132,600 | 66,600 | 50.2 |
| Do | 3 | 135,600 | 64,800 | 47.8 |
| Do | 4 | 135,600 | 64,800 | 47.8 |
| Do | 5 | 137,400 | 67,800 | 49.3 |
| Do | (¹) | 135,720 | 66,000 | 48.6 |
| Sulfuric acid salt | 1 | 137,400 | 79,200 | 57.6 |
| Do | 2 | 140,400 | 81,000 | 57.7 |
| Do | 3 | 141,000 | 84,600 | 60.0 |
| Do | 4 | 142,200 | 87,000 | 61.2 |
| Do | 5 | 138,000 | 87,600 | 63.5 |
| Do | (¹) | 139,800 | 83,880 | 60.0 |

¹ Average.

*Example 3*

The stabilizing effects of 2,2,4-trimethyl-6-ethoxy-1,2-dihydroquinoline and salts thereof were studied on carotene in mixtures of corn oil and alfalfa stored in cotton bags at room temperatures (23° C. to 26° C.) for two months. The following observations were made:

| Wt. percent in mix | | Percent Carotene Retained | |
|---|---|---|---|
| | | After 1 mo. | After 2 mos. |
| None | | 50.3 | 35.3 |
| 0.010 | Base | 71.8 | 56.8 |
| 0.0116 | HCl salt | 74.1 | 59.8 |
| 0.0147 | H₃PO₄ salt | 74.8 | 60.4 |

*Example 4*

The stabilization of carotene in animal foods was studied in replicated experiments using 0.0125 percent by weight of 2,2,4-trimethyl-6-ethoxy-1,2-dihydroquinoline, the hydrochloric acid salt and the 1:1 phosphoric acid salt. A control without a stabilizer was also run simultaneously. The feeds were comprised of 594 grams of alfalfa and 6 grams of corn oil. After two weeks at 55° C. the following observations were made of the percentage of the original carotene still remaining.

Stabilizer: Percent carotene remaining
- None _____ 46.2
- Free base _____ 64.5
- HCl salt _____ 66.9
- H₃PO₄ salt _____ 64.8

These data show that even on a weight basis where significantly less of the quinoline was present in the salt form, the salts produced better results than the free base.

In addition to the carotene containing components and the above described dihydroquinolines, balanced feeds may contain whole grains or process grains, animal and vegetable oils, minerals, antibiotics, steroids, anthelmintics, supplemental vitamins and other compounds which are conventional in the animal feed industries. Such conventional feeds may be benefited by the incorporation of from 0.001 to 0.20 percent by weight of the described salts of the substituted 2,2,4-trimethyl-1,2-dihydroquinoline; preferred practice may utilize from 0.005 to 0.05 percent by weight of the said salts.

Although the invention has been described with respect to the specific modifications it is not intended that the details of these shall be construed as limitations upon the scope of the claims.

What is claimed is:

1. An animal feed comprising a feed component containing a compound selected from the group consisting of carotene and vitamin A, said animal feed containing from about 0.001 to about 0.20 percent by weight of an inorganic acid salt of 2,2,4-trimethyl-6-ethoxy-1,2-dihydroquinoline.

2. An animal feed comprising a feed component containing a compound selected from the group consisting of carotene and vitamin A, said animal feed containing from about 0.001 to about 0.20 percent by weight of the hydrochloric acid salt of 2,2,4-trimethyl-6-ethoxy-1,2-dihydroquinoline.

3. An animal feed comprising a feed component containing a compound selected from the group consisting of carotene and vitamin A, said animal feed containing from about 0.001 to about 0.20 percent by weight of sulfuric acid salt of 2,2,4-trimethyl-6-ethoxy-1,2-dihydroquinoline.

4. An animal feed comprising a feed component containing a compound selected from the group consisting of carotene and vitamin A, said animal feed containing from about 0.001 to about 0.20 percent by weight of a phosphoric acid salt of 2,2,4-trimethyl-6-ethoxy-1,2-dihydroquinoline.

References Cited

UNITED STATES PATENTS

| 2,562,970 | 8/1951 | Thompson | 99—8 |
| 2,897,119 | 7/1959 | Dunn | 99—11 |
| 2,935,449 | 5/1960 | Bavley et al. | 99—2 |

OTHER REFERENCES

Seiden, The Handbook of Feedstuffs, pp. 196, 282, Springer Pub. Co., Inc., New York, N.Y. (1957).

A. LOUIS MONACELL, *Primary Examiner.*

S. J. BAICKER, *Assistant Examiner.*